United States Patent [19]
Whitt

[11] Patent Number: 5,269,150
[45] Date of Patent: Dec. 14, 1993

[54] REGULATOR FOR REFRIGERANT RECLAIMERS

[76] Inventor: Robert E. Whitt, 416 Estate La., Terrell, Tex. 75160

[21] Appl. No.: 951,790

[22] Filed: Sep. 28, 1992

[51] Int. Cl.$^5$ .............................................. F25B 45/00
[52] U.S. Cl. ......................................... 62/77; 62/149; 62/292
[58] Field of Search .................. 62/77, 149, 217, 218, 62/292, 504

[56] References Cited

U.S. PATENT DOCUMENTS

| | | | |
|---|---|---|---|
| 1,643,179 | 9/1927 | Sawyer | 62/504 |
| 2,051,802 | 8/1936 | Philipp | 62/218 |
| 3,103,106 | 9/1963 | Tipton | 62/218 |

*Primary Examiner*—John M. Sollecito
*Attorney, Agent, or Firm*—Johnson & Gibbs

[57] ABSTRACT

A regulator for controlling the flow of refrigerant in a refrigerant reclaiming system having a compressor and a condenser, the regulator comprising a condenser regulator section through which the flow of refrigerant passes after exiting the condenser. The condenser regulator section includes a hollow cylindrical container with an inlet port in the top for receiving the flow of refrigerant, and a hollow tube mounted in the top of the container which extends vertically to the vicinity of the bottom of the container, for releasing refrigerant from the container. A liquid float valve mounted in the lower end of the tube opens the release tube only when liquid refrigerant is present. The regulator may further comprise a compressor regulator section through which the flow of refrigerant passes before entering the compressor. The compressor regulator section includes a pressure sensor connected to the refrigerant reclaiming system for sensing the pressure within the flow of refrigerant after it exits the compressor, and a feedback line to an adjustable inlet valve for adjusting the volume of the flow of refrigerant in response to excessive pressure readings from the pressure sensors.

6 Claims, 3 Drawing Sheets

REGULATOR FOR REFRIGERANT RECLAIMERS

BACKGROUND OF THE INVENTION

1. Field of the Invention

This invention is related to a regulator for refrigerant reclaimers and, more specifically, to condenser and tank pressure controls for refrigerant reclaimers to regulate system and tank pressures at non-excessive levels.

2. Description of Related Art

In the years before it was understood that releasing refrigerants into the atmosphere was harmful to the ozone layer and, therefore, to human health, refrigerants such as Freon were allowed to escape from broken refrigeration units into the atmosphere. Now that the harmful effects of this practice are recognized, servicing technicians are required to reclaim the refrigerant from broken units rather than letting it freely escape. The prior art devices which technicians have used for this function, however, have severe shortcomings in the areas of safety and efficiency. These shortcomings are overcome by the present invention.

Refrigeration units generally include a coil which contains the refrigerant for the system. The refrigerant is under pressure within the coil and is generally in a partially liquid and partially gaseous state. To remove the refrigerant with prior art systems, one end of a hose is connected to the coil, and the other end is connected to the inlet of a compressor. A second hose connects the outlet of the compressor to the inlet of a condenser. A third hose connects the outlet of the condenser to a reclaiming vessel or drum. As the refrigerant is released from the coil of the broken unit, it is in a purely gaseous state due to the reduction of internal pressure. The compressor pumps the gaseous refrigerant from the coil of the broken unit, through the condenser where it is condensed to a liquid state, and into the reclaiming drum.

The problem with the prior art systems is that there has not been a way to control the flow of the refrigerant through the condenser in such a way that the flow remains within the design specifications of the condenser. As a result, too much refrigerant flows through the condenser too quickly, and the temperature and pressure within the condenser rise to a level at which the condenser cannot condense all of the refrigerant. Hot, high-pressure vapor is therefore pumped into the reclaiming drum where temperatures can reach 300 degrees Fahrenheit, and pressures can exceed 400 psi on a hot day. These conditions can be extremely dangerous, as reclaiming drums have been known to explode under these conditions in the past.

In response, reclaiming drums are now manufactured with pressure release plugs which blow out when pressures reach unsafe levels. However, these plugs blow out with tremendous force, and are a safety hazard themselves. Additionally, the plugs cannot be reset, and a new plug must be purchased when one blows out.

The solution in the prior art to the over-heating and over-pressurization problems has been to monitor the temperature and pressure in the reclaiming drum, and when dangerous conditions are approached, to stop reclaiming and refrigerate the drum for 15-30 minutes until the vapor inside is condensed and the dangerous conditions are alleviated. Prior art systems for refrigerating the reclaiming drum include placing the drum in large buckets of ice or dry ice granules. Thus the prior art solution is inefficient because of both the delay involved and the need to carry additional equipment for refrigerating the reclaiming drum. Also, the prior art solution is still dangerous if the conditions of the reclaiming drum are not closely monitored so that reclaiming can be stopped before dangerous limits are exceeded.

SUMMARY OF THE INVENTION

In one sense, the present invention is a regulator for controlling the flow of refrigerant in a refrigerant reclaiming system. The regulator may comprise a condenser regulator section which further comprises a hollow cylindrical container which is connected in series between the condenser of a conventional reclaiming system and a reclaiming drum. When standing upright, the regulator has an inlet valve in the top of the container for receiving the flow of refrigerant into the hollow container. An exit port comprises a hollow tube which extends through the top of the container to the vicinity of the bottom of the container where a liquid float valve is mounted in the hollow tube and allows only liquid refrigerant to exit the container.

The regulator may further comprise a compressor regulator section which further comprises an adjustable inlet valve which controls the volume of the flow of refrigerant before it enters the compressor of a conventional reclaiming system. A feedback line from a pressure sensor downstream of the compressor and in the vicinity of the condenser, causes the adjustable inlet valve to restrict the flow of refrigerant when the system pressure exceeds a predetermined threshold value.

In another sense, the present invention is a method of controlling the flow of refrigerant in a refrigerant reclaiming system having a compressor and a condenser. The method comprises the steps of stopping the flow of refrigerant after the flow exits the condenser whenever the refrigerant is still in a gaseous state. If the refrigerant is in a liquid state, the method continues the flow of refrigerant after it exits the condenser. Additionally, the method may include sensing the pressure within the flow of refrigerant after the flow passes through the compressor and in the vicinity of the condenser, and adjusting the volume of the flow of refrigerant before the flow enters the compressor, in response to sensing pressure which exceeds a predetermined threshold value.

It is an object of the present invention to improve the safety of refrigerant reclaimers by pumping only liquid refrigerant into the reclaiming drum, thereby eliminating the excessive temperatures and pressures of the prior art systems.

It is another object of the present invention to improve the efficiency of the reclaiming operation by eliminating the requirement for a cool-down delay for the reclaiming drum.

It is still another object of the present invention to improve the efficiency of the reclaiming operation by eliminating the requirement to carry additional cooling equipment for the reclaiming drum.

It is yet another object of the present invention to improve the efficiency of the reclaiming operation by enabling the use of lower compression ratios in the system compressor.

It is still yet another object of the present invention to provide a device which may be easily added to any existing refrigerant reclaimer that uses a compressor and condenser assembly.

BRIEF DESCRIPTION OF THE DRAWINGS

The invention will be better understood, and its numerous objects and advantages will become apparent to those skilled in the art by reference to the following drawings in which.

DETAILED DESCRIPTION OF THE INVENTION

Figure 1:
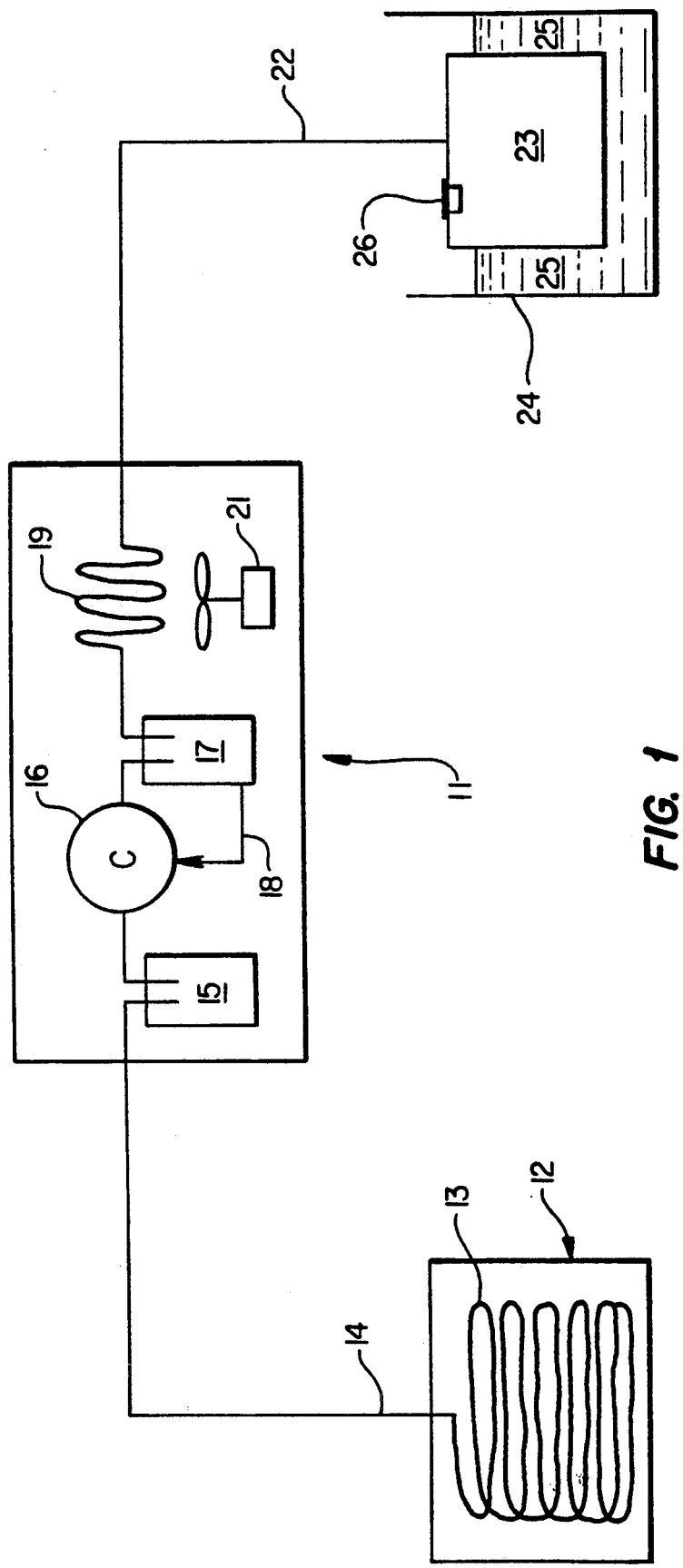
FIG. 1 is a block diagram of a prior art refrigerant reclaiming system.

FIG. 1 is a block diagram of a prior art refrigerant reclaiming system 11 which may be used to extract refrigerant from a broken refrigeration unit 12 where the refrigerant is stored in the coil 13. Various types of refrigerant such as refrigerants R12, R22, R502, and R500 may be used in standard refrigeration units. Three to fifteen pounds of refrigerant may be found in residential refrigeration units, and twenty to one hundred pounds of refrigerant may be found in similar commercial units.

Conventional reclaimers 11 consist of a hose 14 which attaches to the coil 13 for carrying gaseous refrigerant to the reclaimer 11. Upon entering the reclaimer 11 the refrigerant passes through an oil separator/accumulator 15 which removes any oil which may have become suspended in the refrigerant while it was in the air conditioning unit 12, and prevents any liquid from entering the compressor. Oil-free refrigerant then passes into a compressor 16 which serves as a pump, to pump refrigerant out of the broken unit 12 and through the reclaimer 11. Upon exiting the compressor 16 the refrigerant enters an oil separator 17 which separates any oil which may have been placed in the refrigerant by the compressor 16. An oil return line 18 returns the separated oil to the compressor 16 for reuse. Upon leaving the oil separator 17, the gaseous refrigerant flows through a condenser 19 where it is cooled and condensed from a gaseous to a liquid state. A fan 21 generally blows ambient air over the condenser coils to assist the cooling process. The refrigerant leaves the conventional reclaimer 11 through hose 22 where it enters a reclaiming drum 23.

Because the conventional reclaimer 11 has no device to regulate the flow of refrigerant, the capacity of the condenser 19 to condense the refrigerant is often exceeded. This causes hot, high-pressure, gaseous refrigerant to be placed into the reclaiming drum 23. Temperatures as high as 300° F. and pressures as high as 450 psi have been known to occur within the reclaiming drum 23. These hazardous conditions can cause damage to the compressor 16 or other components of the conventional reclaimer 11 or can pose a serious safety problem if the reclaiming drum 23 explodes or blows out its pressure release valve 26.

Figure 2:
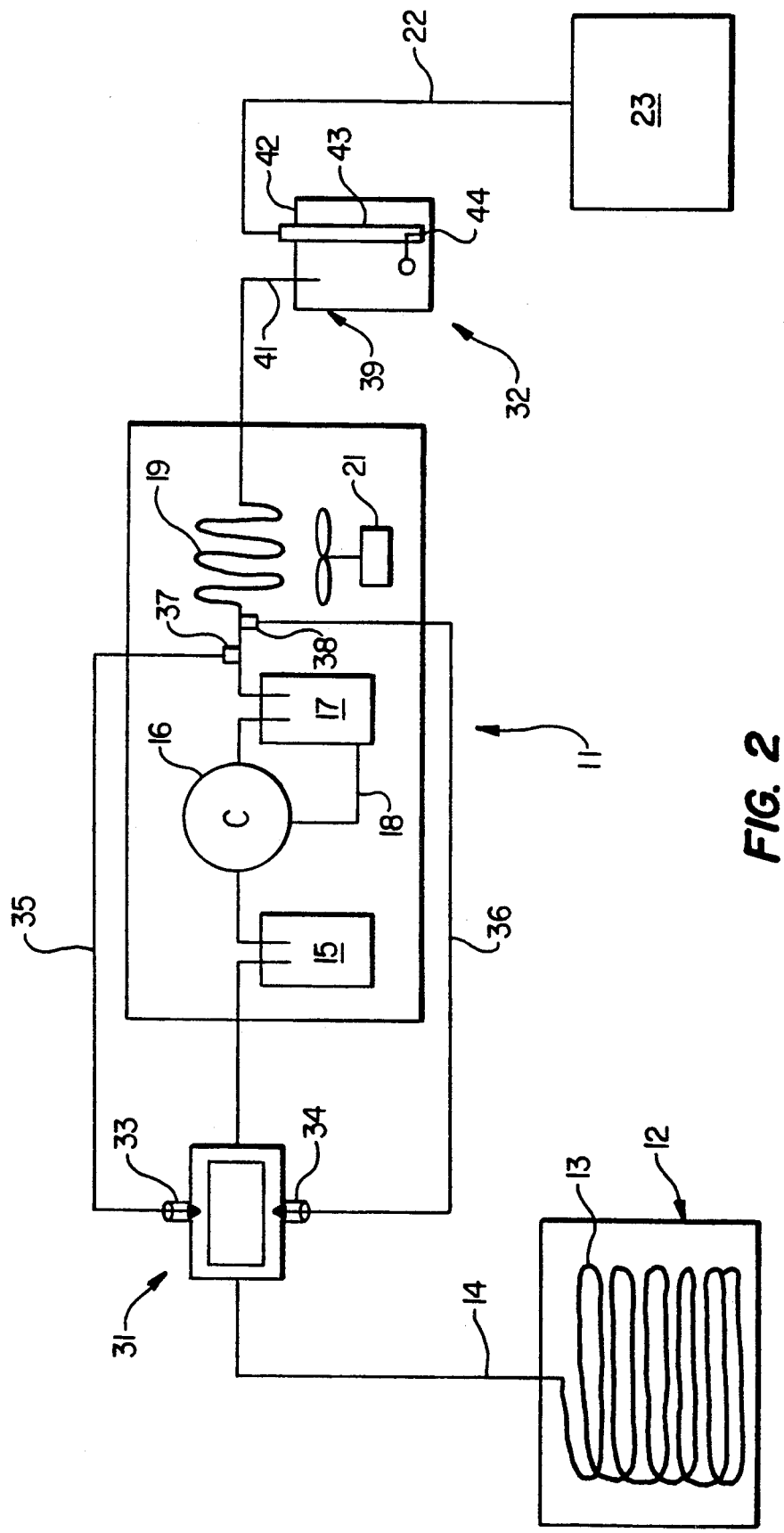
FIG. 2 is a block diagram of a refrigerant reclaiming system equipped with a regulator embodying the principles of the present invention.

FIG. 2 is a block diagram of a refrigerant reclaiming system equipped with a regulator embodying the principles of the present invention. The regulator of the present invention may comprise a condenser regulator section 32 which is connected between the conventional reclaimer 11 and the reclaiming drum 23. Optionally, the regulator of the present invention may also comprise a compressor regulator section 31 which is connected between the broken unit 12 and the conventional reclaimer 11. The optional compressor regulator is further discussed below.

The condenser regulator section 32 is installed between the conventional reclaimer 11 and the reclaiming drum 23. The condenser regulator section 32 may comprise a cylindrical container 39 with an inlet port 41 located in the top surface 42. Also mounted in the top surface 42 is a hollow tube 43 which extends downward in the container 39 to the vicinity of the bottom where there is mounted in the tube 43 a liquid float valve 44. The liquid float valve 44 opens when the level of liquid refrigerant exceeds the level of the valve. As long as the level of liquid refrigerant is below the level of the liquid float valve 44, the float valve remains closed. Thus, only liquid refrigerant is allowed to exit the container 39 through the tube 43 and proceed to the reclaiming drum 23.

In operation, as long as the conventional reclaimer 11 continues to fully condense the reclaimed refrigerant, the regulator of the present invention allows the conventional reclaimer to continue to reclaim refrigerant at its maximum rate. However, when the capabilities of the condenser 19 are exceeded and gaseous, rather than liquid refrigerant is pumped into the condenser regulator section 32, the liquid float valve 44 remains closed, thereby preventing the hot gaseous vapor from entering the reclaiming drum 23. As a result, pressure within the condenser regulator section 32 begins to increase, with a corresponding increase in pressure throughout the section of the conventional reclaimer 11 downstream of the compressor 16. As the pressure increases in the condenser 19 the refrigerant begins to liquify at a higher temperature, and therefore, liquid flow into the condenser regulator section 32 is resumed. The liquid float valve 44 continues to cycle open and closed, and releases any accumulated liquid into the reclaiming drum 23 while retaining any gaseous refrigerant in container 39.

An optional compressor regulator section 31 may be utilized in conjunction with the condenser regulator section 32 to further improve efficiency and enhance the safety of the reclaiming operation. The optional compressor regulator section 31 may comprise one or more adjustable inlet valves represented by inlet valves 33 and 34 in FIG. 2, which regulate the flow of refrigerant from the broken unit 12 to the conventional reclaimer 11. Adjustable inlet valve 33 may be set, for example, to operate in a range of 300 psi to 400 psi and may be utilized when reclaiming refrigerants R22, R502, or R500. Adjustable inlet valve 34 may be set, for example, to operate in a range of 125 psi to 250 psi and may be utilized when reclaiming refrigerant R12. Each of the adjustable inlet valves 33 and 34 is connected by one of the feedback lines 35 and 36 to pressure sensors 37 and 38 which may be located at any point downstream of the compressor 16, for example, in the vicinity of the condenser 19. When the measured pressure downstream of the compressor 16 rises above predetermined levels, the adjustable inlet valves 33 and 34 reduce the flow of refrigerant flowing from the broken unit 12 to the conventional reclaimer 11.

Figure 3:
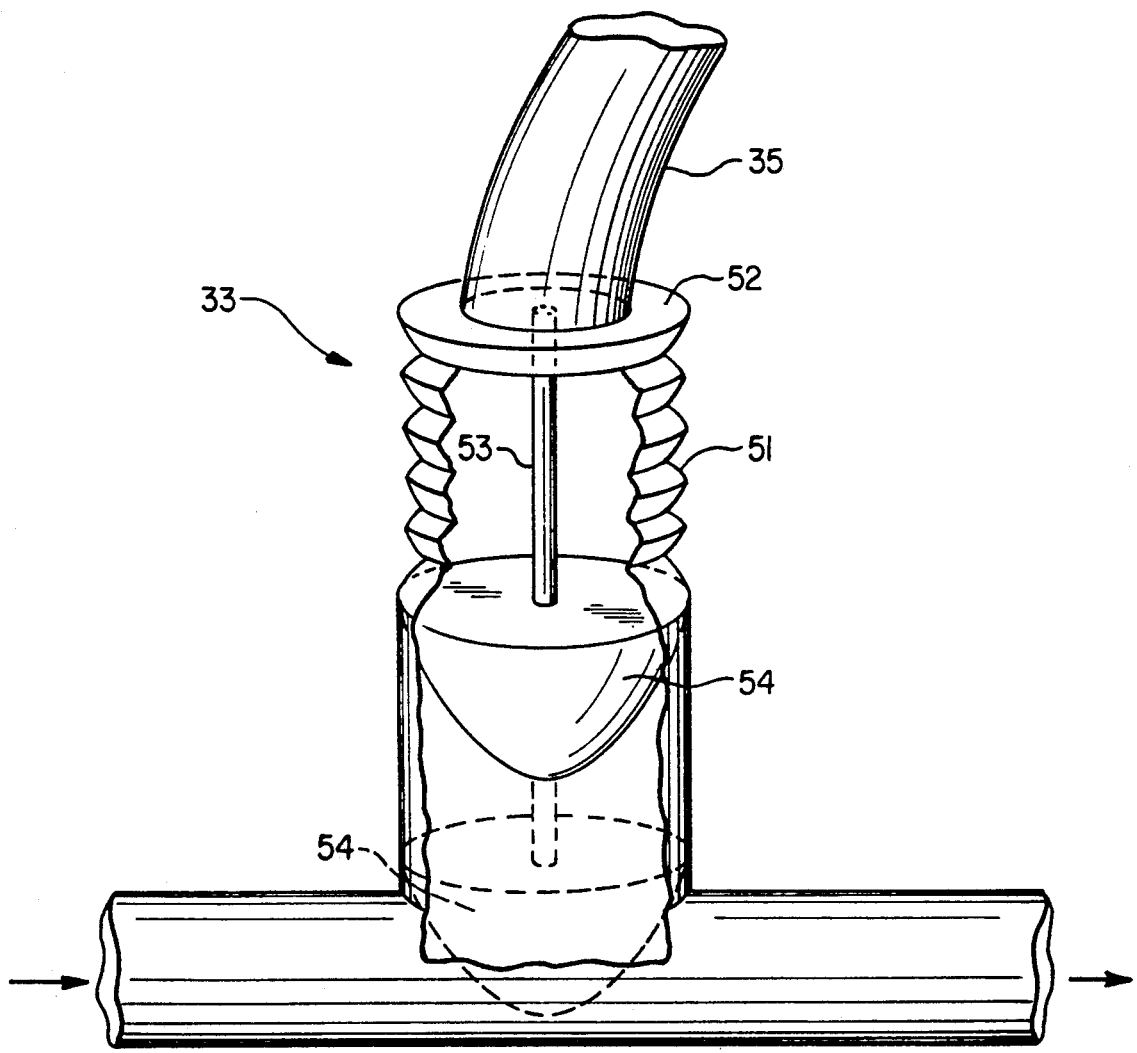
FIG. 3 is a side elevational, cross sectional view of an adjustible inlet valve embodying the principles of the present invention.

FIG. 3 is a side elevational, partial cut-away view of an adjustable inlet valve 33 embodying the principles of the present invention. The adjustable inlet valve 33 may be of the normally open type. A spring body 51 may be, for example, constructed of brass material, and is shaped in any suitable, elastically compressible shape. The spring tension of the spring body 51 is such that adjustable inlet valve 33, utilized when reclaiming refrigerants R22, R500, or R502, is compressed when the pressure in feedback line 35 exerts a pressure exceeding 300 to 400 psi on an upper diaphragm 52. Adjustable inlet valve 34, utilized when reclaiming refrigerant R12, is identical to inlet valve 33 except that inlet valve 34 is compressed when the pressure in feedback line 36 exerts a pressure exceeding 125 to 250 psi on the upper diaphragm 52. A valve stem 53 is attached at one end to the upper diaphragm 52, and at the other end to a valve stopper 54. When pressure from the applicable feedback line is exerted on the diaphragm 52, the spring body 51 of the valve compresses, thus displacing the valve stem 53 and moving the valve stopper 54 into the flow of refrigerant, thereby reducing the volume thereof. The position of the valve stopper 54 when the spring body 51 is compressed, is shown in phantom in FIG. 3.

In operation, as long as the conventional reclaimer 11 continues to fully condense the reclaimed refrigerant, the pressure downstream of the compressor 16 remains within safe levels, and the regulator of the present invention allows the conventional reclaimer to continue to reclaim refrigerant at its maximum rate. If the capabilities of the condenser 19 are exceeded and gaseous, rather than liquid refrigerant is pumped into the condenser regulator section 32, the liquid float valve 44 remains closed, thereby causing the pressure downstream of the compressor 16 to increase. If the pressure continues to rise to a level above a predetermined threshold value, the pressure sensors 37 and 38 send signals via the feedback lines 35 and 36 to the adjustable inlet valves 33 and 34. The adjustable inlet valves 33 and 34 adjust the volume of the flow of refrigerant from the broken unit 12, thereby decreasing the pressure downstream of the compressor 16 and maintaining safe operating levels.

The addition of the regulator of the present invention to a conventional refrigerant reclaimer therefore results in improved safety and efficiency. The hazardous high temperatures and pressures which build up in the reclaiming drums of conventional reclaimers are eliminated with the present invention. Since the condenser regulator section 32 allows only liquid refrigerant to enter the reclaiming drum, and retains the hot gaseous vapors, temperatures and pressures in the reclaiming drum 23 stay well within safe parameters.

The regulator of the present invention enhances the efficiency of the reclaiming operation in several ways. First, the efficiency is improved by eliminating the requirement for a cool-down delay for the reclaiming drum 23. Since the condenser regulator section 32 allows only liquid refrigerant to enter the reclaiming drum, and retains the hot gaseous vapors, the drum does not need to be cooled. Second, the efficiency of the reclaiming operation is improved by eliminating the requirement to carry additional cooling equipment for the reclaiming drum 23. Third, the present invention improves the efficiency of the reclaiming operation by enabling the use of lower compression ratios in the system compressor. In conventional reclaimers, pressures downstream of the compressor can be as high as 450 psi. The compressor must pump refrigerant against this pressure, and therefore, must have a high compression ratio. When the present invention is installed, system pressures generally remain below 350 psi. Therefore, the compressor can operate at a lower compression ratio which is more efficient.

It should be noted that the present invention is designed to be easily added to any conventional refrigerant reclaimer 11 that uses a compressor and condenser assembly. The compressor regulator section 31, if used, is installed at the front end of the reclaiming process, and the condenser regulator section 32 is installed at the back of the reclaiming process. With the addition of pressure sensors 37 and 38 in the condenser section, with feedback lines 35 and 36 connected to the adjustable inlet valves 33 and 34, the installation is complete, and the safety and efficiency of any conventional refrigerant reclaimer is enhanced.

Thus, there has been described and illustrated herein, the preferred embodiment of a regulator for refrigerant reclaiming systems. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. An apparatus for controlling the flow of refrigerant in a refrigerant reclaiming system having a compressor and a condenser, said apparatus comprising:
   a condenser regulator section through which said flow of refrigerant passes after exiting said condenser, said regulator section further comprising:
   a hollow container having a top and a bottom;
   an inlet port mounted in said top of said container for receiving said flow of refrigerant;
   a hollow tubular member mounted in said top of said container and extending vertically therethrough, with a lower end in the vicinity of said bottom of said container, for expelling said flow of refrigerant; and
   a normally closed, liquid float valve mounted in said lower end of said hollow tubular member, said liquid float valve biased to open said tubular member when liquid refrigerant is present, and to close said tubular member when liquid refrigerant is not present.

2. An apparatus for controlling the flow of refrigerant in a refrigerant reclaiming system having a compressor and a condenser, said apparatus comprising:
   a condenser regulator section through which said flow of refrigerant passes after exiting said condenser, said regulator section further comprising:
   a hollow container having a top and a bottom;
   an inlet port mounted in said top of said container for receiving said flow of refrigerant;
   a hollow tubular member mounted in said top of said container and extending vertically therethrough, with a lower end in the vicinity of said bottom of said container, for expelling said flow of refrigerant;
   a liquid float valve mounted in said lower end of said hollow tubular member for opening said tubular member when liquid refrigerant is present, and closing said tubular member when liquid refrigerant is not present;
   a compressor regulator section through which said flow of refrigerant passes before entering said compressor, said compressor regulator section further comprising:

an adjustable inlet valve for adjusting the volume of said flow of refrigerant into said compressor;

a pressure sensor connected to said refrigerant reclaiming system for sensing the pressure within said flow of refrigerant after said flow passes through said compressor, and in the vicinity of said condenser; and a feedback line connecting said pressure sensor to said adjustable inlet valve.

3. A method of controlling the flow of refrigerant in a refrigerant reclaiming system having a compressor and a condenser, said method comprising the steps of:

stopping said flow of refrigerant after said flow exits said condenser if said refrigerant is still in a gaseous state; and continuing said flow of refrigerant after said flow exits said condenser if said refrigerant is in a liquid state.

4. A method according to claim 3 which further comprises the steps of:

sensing the pressure within said flow of refrigerant after said flow passes through said compressor, and in the vicinity of said condenser;

comparing said sensed pressure to a predetermined threshold value; and adjusting the volume of said flow of refrigerant before said flow enters said compressor, in response to said pressure exceeding said predetermined threshold value.

5. An apparatus for controlling the flow of refrigerant in a refrigerant reclaiming system having a compressor and a condenser, said apparatus comprising:

means for stopping said flow of refrigerant through said condenser if said refrigerant exits said condenser in a gaseous state, said stopping means located downstream of said condenser; and means for continuing said flow of refrigerant through said condenser if said refrigerant exits said condenser in a liquid state.

6. An apparatus for controlling the flow of refrigerant in a refrigerant reclaiming system having a compressor and a condenser, said apparatus comprising:

means for stopping said flow of refrigerant after said flow exits said condenser if said refrigerant is still in a gaseous state;

means for continuing said flow of refrigerant after said flow exits said condenser if said refrigerant is in a liquid state;

means for sensing the pressure within said flow of refrigerant after said flow passes through said compressor, and in the vicinity of said condenser;

means for comparing said sensed pressure to a predetermined threshold value; and means for adjusting the volume of said flow of refrigerant before said flow enters said compressor, in response to said pressure exceeding said predetermined threshold value.

* * * * *